United States Patent
Ishii et al.

(10) Patent No.: US 11,455,253 B2
(45) Date of Patent: Sep. 27, 2022

(54) SET INDEXING FOR FIRST-LEVEL AND SECOND-LEVEL SET-ASSOCIATIVE CACHE

(71) Applicant: Arm Limited, Cambridge (GB)

(72) Inventors: Yasuo Ishii, Austin, TX (US); James David Dundas, Austin, TX (US); Chang Joo Lee, Austin, TX (US); Muhammad Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 63 days.

(21) Appl. No.: 17/060,624

(22) Filed: Oct. 1, 2020

(65) Prior Publication Data

US 2022/0107898 A1     Apr. 7, 2022

(51) Int. Cl.
| | |
|---|---|
| *G06F 12/0864* | (2016.01) |
| *G06F 12/121* | (2016.01) |
| *G06F 12/0873* | (2016.01) |
| *G06F 12/0811* | (2016.01) |

(52) U.S. Cl.
CPC ...... *G06F 12/0864* (2013.01); *G06F 12/0811* (2013.01); *G06F 12/0873* (2013.01); *G06F 12/121* (2013.01)

(58) Field of Classification Search
CPC ............. G06F 12/0811; G06F 12/0864; G06F 12/0873; G06F 12/121
See application file for complete search history.

(56) References Cited

U.S. PATENT DOCUMENTS

| | | | | |
|---|---|---|---|---|
| 2003/0208658 | A1* | 11/2003 | Magoshi | G06F 12/0811 711/E12.024 |
| 2015/0143047 | A1* | 5/2015 | Hagersten | G06F 12/1054 711/122 |
| 2015/0363321 | A1* | 12/2015 | Skillman | G06F 12/0884 711/120 |
| 2018/0004525 | A1* | 1/2018 | Baghsorkhi | G06F 12/0875 |
| 2018/0203802 | A1* | 7/2018 | Alves | G06F 12/0862 |

OTHER PUBLICATIONS

Adiga et al., "The IBM z15 High Frequency Mainframe Branch Predictor", 2020 ACM/IEEE 47th Annual International Symposium on Computer Architecture (ISCA), May 30-Jun. 3, 2020, pp. 27-39.
Bonanno et al., "Two Level Bulk Preload Branch Prediction", 2013 IEEE 19th International Symposium on High Performance Computer Architecture (HPCA), Feb. 2013, 12 pages.

\* cited by examiner

*Primary Examiner* — Aracelis Ruiz
(74) *Attorney, Agent, or Firm* — Nixon & Vanderhye P.C.

(57) ABSTRACT

An apparatus comprises first-level and second-level set-associative caches each comprising the same number of sets of cache entries. Indexing circuitry generates, based on a lookup address, a set index identifying which set of the first-level set-associative cache or the second-level set-associative cache is a selected set of cache entries to be looked up for information associated with the lookup address. The indexing circuitry generates the set index using an indexing scheme which maps the lookup address to the same set index for both the first-level set-associative cache and the second-level set-associative cache. This can make migration of cached information between the cache levels more efficient, which can be particularly useful for caches with high access frequency, such as branch target buffers for a branch predictor.

16 Claims, 5 Drawing Sheets

SET INDEXING FOR FIRST-LEVEL AND SECOND-LEVEL SET-ASSOCIATIVE CACHE

BACKGROUND

Technical Field

The present technique relates to the field of caches.

Technical Background

A data processing system may have one or more caches for caching information associated with a subset of addresses. The caches can be looked up based on a lookup address to identify whether any of the caches is storing valid information associated with the lookup address.

SUMMARY

At least some examples provide an apparatus comprising:
a first-level set-associative cache comprising a plurality of sets of cache entries;
a second-level set-associative cache comprising a plurality of sets of cache entries, where a number of sets in the first-level set-associative cache is the same as a number of sets in the second-level set-associative cache; and
indexing circuitry to generate, based on a lookup address, a set index identifying which set of the first-level set-associative cache or the second-level set-associative cache is a selected set of cache entries to be looked up for information associated with the lookup address,
where the indexing circuitry is configured to generate the set index using an indexing scheme which maps the lookup address to the same set index for both the first-level set-associative cache and the second-level set-associative cache.

At least some examples provide an apparatus comprising:
first-level means for caching information in a plurality of sets of cache entries accessed according to a set-associative cache access policy;
second-level means for caching information in a plurality of sets of cache entries accessed according to a set-associative cache access policy, where a number of sets in the first-level means for caching is the same as a number of sets in the second-level means for caching; and
means for generating, based on a lookup address, a set index identifying which set of the first-level means for caching or the second-level means for caching is a selected set of cache entries to be looked up for information associated with the lookup address;
where the means for generating is configured to generate the set index using an indexing scheme which maps the lookup address to the same set index for both the first-level means for caching and the second-level means for caching.

At least some examples provide a method comprising:
caching information in a first-level set-associative cache comprising a plurality of sets of cache entries;
caching information in a second-level set-associative cache comprising a plurality of sets of cache entries, where a number of sets in the first-level set-associative cache is the same as a number of sets in the second-level set-associative cache; and
generating, based on a lookup address, a set index identifying which set of the first-level set-associative cache or the second-level set-associative cache is a selected set of cache entries to be looked up for information associated with the lookup address, where the set index is generated using an indexing scheme which maps the lookup address to the same set index for both the first-level set-associative cache and the second-level set-associative cache.

Further aspects, features and advantages of the present technique will be apparent from the following description of examples, which is to be read in conjunction with the accompanying drawings.

DESCRIPTION OF EXAMPLES

Figure 1:
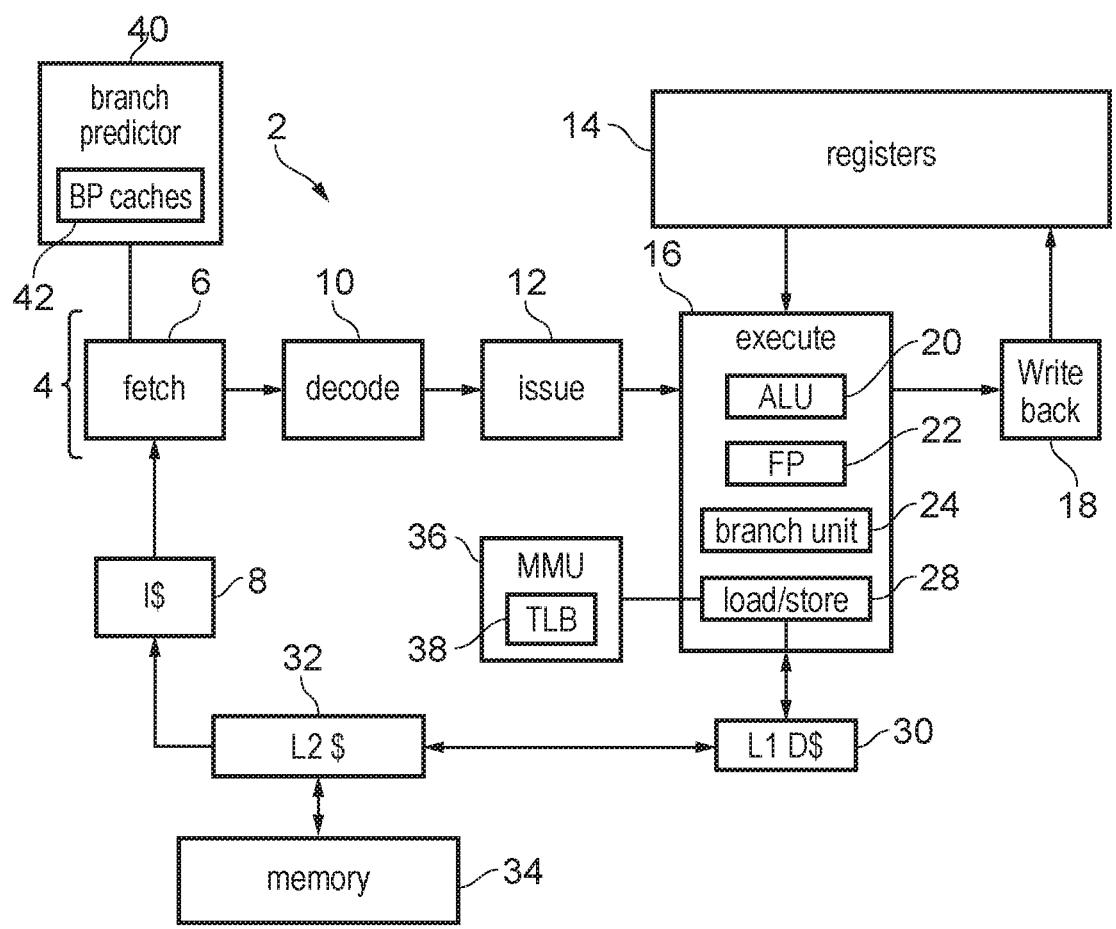
FIG. 1 schematically illustrates an example of a data processing system having a number of types of cache.

A processing system may have multiple levels of cache in a cache hierarchy. it may be desirable to provide increased cache capacity by increasing a number of cache entries in a given cache, but in general, the larger the cache, the slower the cache will be to access because the increased size means that signal paths for accessing the cache become longer and increase the latency of accessing the cache. In comparison to a single level of cache (which has equivalent cache capacity to the total capacity of the multiple levels of cache in the hierarchy), a multi-level cache hierarchy can provide a better balance between capacity and performance, as access to a first-level cache holding a smaller amount of data can be faster than would be possible for a single large cache; but when there is a miss in the first-level cache then the second-level cache provides additional storage capacity.

The first and second levels of cache may each be implemented as a set-associative cache, where the cache entries are logically divided into a number of sets. When the data in one of the caches needs to be accessed, indexing circuitry generates, based on a lookup address (representing the address associated with information to be written to or read from the cache), a set index identifying which set of entries of the first-level cache or second-level cache is a selected set of cache entries to be looked up for information associated with the lookup address. Each set of entries may comprise a certain number of cache entries, where the number of cache entries in one set is referred to as the associativity of the cache. The set-associative cache could be a direct-mapped cache (which is a special case of a set-associative cache for which the associativity is one) or could be a set-associative cache with an associativity of two or more. The set-associative scheme means that information associated with a particular address may be allocated to any of the cache entries in the selected set of cache entries which corresponds to the set index derived from the given address, but is not allowed to be allocated to a different set of cache entries associated with a different value of the set index.

When a multi-level cache hierarchy is provided, in typical schemes it is usual for the second-level set-associative cache to use a different indexing scheme and a different number of sets compared to the first-level set-associative cache in the hierarchy. This can be useful to allow the second-level cache to provide a greater capacity for example, without paying the circuit area and power penalty of increasing the associativity of the second-level set-associative cache excessively which would incur extra circuit overhead in implementing additional comparators for comparing tags for determining whether each entry in the indexed set corresponds to the lookup address. Hence, it is conventional for the first and second levels of set-associative cache to use different numbers of sets and different set indexing schemes so that the lookup address would be mapped to different set indices for the first and second levels of cache respectively.

However, the inventors recognised that this approach can cause some performance issues in some scenarios where cache entries are migrated between levels of cache. This can be a particular problem for multi-level cache hierarchies which need to support fast performance, such as caches in branch predictors for example.

In the examples discussed below, the second-level set-associative cache is provided with the same number of sets as the first-level set-associative cache. This does not necessarily mean that the number of cache entries in the second-level set-associative cache is the same as the number of cache entries in the first-level set-associative cache, as the first and second levels of cache could still have different associativity (different numbers of entries per set). However, by aligning the number of sets in the first and second levels of cache and using a common indexing scheme which maps the lookup address to the same set index for both the first and second levels of set-associative cache, this can speed up performance especially when migrating entries between the first and second levels of cache. The indexing scheme used for the first-level and second-level set-associative caches may be incapable (for any given address selected as the lookup address) of mapping the lookup address to a different set index for the first-level set-associative cache compared to the set index for the second-level set-associative cache. In other words, the set indices for the first-level and second-level caches are constrained to be the same for any given lookup address.

While the examples below are discussed in the context of the first-level cache and a second-level cache, the overall cache hierarchy of which the first-level and second-level caches form a part may have more than two levels in some examples, and in this case the first-level cache and second-level cache could be any two levels of cache within the hierarchy (e.g. the "first-level" and "second-level" caches described below could be the level-1 and level-2 caches of a 3-level cache hierarchy, or could be the level-2 and level-3 caches of a 3-level cache hierarchy). Hence, the technique is not limited to only having two levels of cache, and the "first-level" and "second-level" caches do not need to correspond to level-1 and level-2 respectively—there could be at least one further level cache which is accessed in the cache hierarchy prior to the "first-level" cache.

Cache access circuitry may be provided to perform a first cache lookup to determine whether any of the selected set of cache entries in the first-level set-associative cache caches the information associated with the lookup address, and a second cache lookup to determine whether any of the selected set of cache entries in the second-level set-associative cache caches the information associated with the lookup address. The second cache lookup may not be necessary for all accesses to the cache hierarchy, for example if there is a hit in the first cache lookup then the second cache lookup could be suppressed. In some examples, the second-level cache may be looked up only in the event of a cache miss in the first-level cache. In other examples, the second-level cache could be looked up (in some scenarios at least) even if there is a cache hit in the first-level cache. For example, in some implementations, a speculative access to the second-level cache could be initiated prior to determining whether the lookup of the first-level cache identifies a hit or miss, to reduce the overall latency of accessing the second-level cache). Other designs may choose not to lookup the second-level cache speculatively to save power, but may still support lookups of the second-level cache in some scenarios when there is a cache hit in the first-level cache. For example, some forms of multi-level cache may support storing multiple entries corresponding to the same lookup address, with one entry for that lookup address stored in the first-level cache and another entry for the same lookup address stored in the second-level cache. For example, in a branch target buffer structure for caching information on target addresses of branch instructions, for which the lookup address is an instruction block address identifying a block of multiple instructions, it is possible that an instruction block could comprise multiple branches in the same block and so it may be desired in some designs to allow both the first-level and second-level caches to store entries corresponding to the same instruction block address, to allow predictions of target addresses for multiple branches in the same block. Therefore, sometimes it may be desirable to perform the second cache lookup even if there is a hit in the first cache lookup.

When the second cache lookup identifies a cache hit (where a hit entry of the selected set of cache entries in the second-level cache caches the information associated with the lookup address), and there is no invalid entry in the selected set of cache entries of the first-level cache which can accommodate the information from the hit entry of the second-level cache, the cache access circuitry may swap contents of the hit entry of the second-level cache and a victim entry of the selected set of cache entries in the first-level cache. As the lookup address corresponds to the same set index for both the first and second levels of cache, this means that promotions of entries from the second level to the first level can be implemented simply by swapping contents of respective entries in the first and second levels of cache, so only two entries in total would need to be updated, one in the first-level cache and one in the second-level cache. In contrast, if different numbers of sets and different set indexing schemes were used for the first and second levels of cache, then when promoting data from the second level to the first level could sometimes require eviction of data from the first-level cache associated with an address which maps to a different set in the second level cache other than the set including the hit entry, so that three different cache entries would need to be updated to implement the migration, one in the first level of cache and two in the second level of cache. The alignment of the set indexing schemes for the two levels of caches therefore helps to improve performance by eliminating the need for this third entry update.

Hence, when the second cache lookup identifies the cache hit and an entry of the first-level cache needs to be evicted as there is no invalid entry available for accommodating the data from the hit entry, the cache entry of the second-level set-associative cache that is updated with contents of the victim entry of the first-level set-associative cache may be the hit entry of the second-level cache regardless of which address is associated with information cached in the victim entry of the first-level set-associative cache. This contrasts with the case if different set indexing schemes were used for the first and second level caches, in which case the entry of the second level cache that would be updated with evicted contents form the first level cache would be selected depending on tag information indicating which address is associated with a victim entry of the first-level cache form which the information was evicted.

When swapping the contents of the hit entry of the second-level cache and the victim entry of the first-level cache, the cache access circuitry may perform an atomic update operation on the hit entry and the victim entry. The atomic update operation may be an operation to update multiple entries in a way that is perceived as indivisible by any requester which triggers a lookup of the first-level or second-level caches. That is, subsequent requests to lookup the caches may see the effects of the atomic updates on both the hit entry and the victim entry, or see the effects of neither of the updates made to the hit entry and the victim entry, but are not allowed to trigger a lookup response which would reflect that only one of the updates of the hit entry and the victim entry has taken place already while the other of these entries has not yet been updated. By updating the hit entry and the victim entry through an atomic update operation, this helps to preserve performance by reducing the risk of information for a particular address previously held in one of the first-level and second-level caches temporarily being indicated as not being cached in either of the first-level and second-level caches, which could be a risk if one of the hit entry and victim entry was updated first and then the other was updated subsequently, rather than updating them atomically. There may be a number of ways of enforcing an atomic update. One approach could be to prevent lookups to the cache being made in the period between updating one of the entries and updating the other. However, for improving performance, some systems may allow lookups to continue but may enforce the atomic update by providing a mechanism where a single write request may cause entries in both caches to be updated simultaneously. For example, due to the alignment of the set indexing schemes it may be possible to read out an entire set of entries identified by the same set index in both caches, perform the required updates while the read out sets of entries from both levels of cache are temporarily stored elsewhere and then write the updated values for the respective sets of entries back to the first and second levels of cache in a single operation.

When both the first and second cache lookups identify a cache miss where none of the selected set of cache entries in both the first/second-level caches holds the information associated with the lookup address, new information associated with the lookup address may be allocated into the cache structure. A first victim entry may be selected from the selected set of cache entries in the first-level cache and a second victim entry may be selected from the selected set of cache entries of the second-level cache. Contents of the first victim entry may be written from the first-level cache to the second victim entry in the selected set of the second-level cache, and the first victim entry in the first-level cache may be allocated for storing the information associated with lookup address.

Again, this process for evicting information from the first victim entry to the second victim entry may be made faster by the fact that the first and second levels of cache share the same indexing scheme. Since the set index for identifying the selected set of cache entries corresponding to the lookup address is the same in both the first-level and second-level caches regardless of which address corresponds to the first victim entry, this means it is not necessary to check contents of the first victim entry to determine the set of the second-level cache to which the contents of the first victim entry should be evicted. In contrast, with standard approaches where the second-level cache has a different set indexing scheme from the first-level, it would be needed to check a tag portion of the first victim entry to determine which address is associated with that entry so that that address can then be mapped to the set index according to the second set indexing scheme used for the second-level cache. This is not necessary in the technique discussed below because of the alignment of indexing schemes.

Hence, when selecting the second victim entry, the selection of the second victim entry may be independent of the contents of the first victim entry, which can be useful for performance because it may allow some processes for selecting the second victim entry to be initiated earlier than would be possible if the contents of the first victim entry had to be read first.

For example, selection of the second victim entry may be based on replacement policy information associated with the selected set of cache entries of the second-level set-associative cache. The replacement policy information may be read before a read of the first victim entry is complete, which helps to improve performance. Also, the reading of the replacement policy information may be performed in parallel with at least one of: the first cache lookup, the second cache lookup, and reading of the first victim entry to obtain the contents to be written to the second victim entry. This might not be possible in implementations which use different indexing schemes for the first and second levels of cache.

When updating the first and second victim entries to allocate the first victim entry for storing the information associated with the lookup address and writing the contents of the first victim entry to the second victim entry, the cache access circuitry may update the first and second victim entries by performing an atomic update operation, which as mentioned above ensures that subsequent lookups see the effects of both updates and cannot only see a partial update of one of the entries while the other is not updated. This helps to improve performance by avoiding loss of performance caused by non-atomic updates which could risk a lookup temporarily seeing that a given address is not cached at all in the hierarchy when actually this is because the corresponding entry was being transferred to a different cache level. Again, the atomic update operation could be implemented in different ways, e.g. by providing a hardware mechanism for a unified read/write/update operation to update information in the selected set of entries in both first-level and second-level caches simultaneously.

Access latency may be greater for accesses to the second-level cache than for accesses to the first-level cache. Hence, in response to a cache access request to request information associated with the lookup address, when the information associated with the lookup address is obtained from the first-level set-associative cache, the information is accessible in fewer cycles than when the information associated with the lookup address is obtained from the second-level set-associative cache.

The alignment of set indexing schemes can be particularly useful where the second-level set-associative cache is an exclusive cache. For an inclusive cache, each entry cached in the first-level cache also has a corresponding entry in the second-level cache. In contrast, for an exclusive cache the second-level cache need not contain any entry associated with an address for which the first-level cache holds a valid entry. While an exclusive policy may help to increase the number of distinct addresses which can be cached within the cache hierarchy, using an exclusive policy may increase the overhead in handling evictions from the first-level cache, as it may require second-level cache entries to be updated/evicted/allocated when an entry is evicted from the first-level cache (which would not be necessary in an inclusive scheme as there would already be a second-level cache entry corresponding to the information evicted from the first-level cache). The alignment of the set indexing schemes between the first and second levels of cache can therefore be particularly beneficial for cache hierarchies where the second-level cache is an exclusive cache, as the alignment of set indexing schemes helps to reduce the performance cost of managing such evictions since the set to allocate the data into in the second-level cache can be known before the victim entry has been read from the first-level cache.

The number of ways (cache entries) per set can be the same in the first-level set-associative cache and the second-level set-associative cache. Alternatively, the first and second levels of cache may have different numbers of ways per set (while still having the same number of sets). In some implementations, the second-level cache could have a smaller number of ways per set than the first-level cache (it is not essential for the capacity of the second-level cache to be greater than the first-level cache, when an exclusive cache is used for the second-level cache). However, in some implementations, the second-level set-associative cache may have a greater number of ways per set than the first-level set-associative cache. This means that the capacity of the second-level cache may be greater than the capacity of the first-level cache.

One might consider it to be counter-intuitive to use the same number of sets in the second-level cache as in the first-level cache, because for a given size of second-level cache designed to provide a certain required number of cache entries, if the number of sets has to be reduced to match the number of sets in a smaller first-level cache, then this would imply that the number of ways (cache entries) per set would need to increase (the second-level cache would have greater associativity than the first-level cache in that case). Normally, when implementing a cache with a certain number of entries, a designer may favour increasing the number of sets compared to increasing the number of ways, because each additional way incurs an incremental circuit area and power cost of providing additional comparison logic for comparing an address tag stored in that way with a corresponding tag portion of the lookup address. In contrast, increasing the number of sets does not incur as great an incremental cost as it can be implemented by changing a hash function used by the indexing circuitry to derive the set index from the lookup address and increasing the number of bits allocated for the set index, which would typically incur a lower additional cost per additional set than would be incurred per additional cache way. This is why many conventional approaches would not align the number of sets in the first and second levels of cache. However, counter-intuitively, the inventors recognise that for the reasons discussed above, aligning the number of sets in the first and second cache levels can help to improve performance associated with migrating entries between levels of cache, which may be preferred for some implementations even at the expense of additional circuit area/power cost of additional cache ways.

This technique can be particularly useful in cases where the first-level set-associative cache and the second-level set-associative cache each comprise single-ported random access memory (RAM). Unlike dual-ported cache RAM which may have two write/read ports and so may be capable of two simultaneous read or write operations per cycle, a single-ported cache RAM may only be capable of a single read or write operation per cycle, because there may only be access ports for supplying a single address and access request per cycle (note that the address provided on that access port would be an address defined according to the hardware RAM structure of the cache memory hardware, which may be in a different address space from the address space defined for the lookup address being looked up in the cache). While the techniques discussed above could be useful even for dual-ported cache RAMs, the techniques can be particularly useful in cases where the cache comprises single-ported RAM, as the single-ported RAM imposes restrictions on the rate at which entries can be read/updated in the caches, so eliminating the third entry update on promoting entries from the second-level cache to the first-level cache, or reducing latency by enabling victim entries to be identified earlier as described in the earlier examples, can be particularly beneficial for single-ported RAM embodiments. In some implementations, the first-level cache and second-level cache may each comprise a separate module of single-ported RAM, so that there is one access port for the first-level cache and one access port for the second-level cache. Other examples may provide a single access port shared between both cache levels (i.e. the first-level and second-level cache may correspond to different portions of a single cache RAM module, but where the locations associated with the first-level cache may be accessible with shorter latency than the locations associated with the second-level cache).

The techniques discussed above can be used for a wide variety of types of cache. For example, the cache could comprise one of a data cache, an instruction cache or an address translation cache such as a translation lookaside buffer.

Also, the technique could be applied to first-level and second-level caches which act as predictive storage structures to cache prediction information used to determine predicted behaviour associated with the lookup address. For example, the predicted behaviour could be used to control speculative operations by a processor. A recovery mechanism may be provided to trigger a recovery action when a mispredictions is identified. The prediction information stored in the first-level and second-level caches could be updated based on actual behaviour detected from executing instructions. For example, the first-level and second-level set-associative caches may provide branch prediction information used by branch prediction circuitry to determine predicted branch instruction behaviour. The techniques discussed above could also be used for multi-level cache hierarchies used as other types of prediction storage structure, not related to branch prediction, such as an address prediction structure for predicting patterns of addresses of instructions to be executed or data accesses to be made to memory, which could be used to initiate early requests to obtain data or instructions from memory or a cache. It will be appreciated that other aspects of processing apparatus behaviour could also be predicted using a predictive storage structure. For any of such types of cache, when implemented using a multi-level cache hierarchy with first and second levels of cache, the first and second levels may be provided with the same number of sets and use a common indexing scheme as discussed above.

However, the technique is particularly useful for branch prediction circuitry, because often the performance requirements for branch prediction circuitry may be greater than for data caches or other types of cache where a slower performance may be tolerated. For branch predictors in particular, the branch predictor is a very busy component of a data processing system because it may be looked up on every cycle to identify possible branch prediction information for determining the next fetch address to be looked up in the following cycle. In contrast other types of cache may be accessed less frequently. Hence, the techniques discussed above for aligning the set indexing schemes for first-level and second-level set-associative caches can be particularly beneficial for branch prediction caches.

In particular, the branch prediction circuitry may have a branch target buffer (BTB) which caches branch target buffer information which indicates properties of taken branch instructions predicted to occur within a block of instructions associated with a given address. The BTB may be implemented as a multi-level cache hierarchy, and so the first-level and second-level caches mentioned earlier may be first-level and second-level BTBs. Branch prediction circuitry may determine a predicted target address for a first taken branch instruction predicted to occur within a block of one or more instructions associated with lookup address based on branch target buffer information cached in a cache entry of the first-level or second-level set-associative cache associated with lookup address. In such a branch target buffer, performance demands are extremely high compared to other types of caches because the prediction information provided by the branch target buffer is used to form a prediction of a branch target address which may then be used as the lookup address for a subsequent cycle, and so delays in looking up the caches may cause bubbles in the pipeline. If single-ported RAM is used to implement the level one and level two BTBs, then this may create a challenge in handling movement of data between the levels of cache while still meeting performance demands. By using a common indexing scheme for both levels of cache and an identical number of sets in both levels of cache for the BTB, this can greatly help to reduce the latency of entry migrations and hence improve performance.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. The branch prediction caches may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken.

Hence, the data processing system may include a number of cache structures, including for example the data cache 30, instruction cache 8, level 2 cache 32, TLB 38 and/or branch prediction caches 42. It will be appreciated that other types of cache structure could also be provided. For example, other types of prediction caches could include a data prefetcher cache which caches information for predicting data addresses for future load/store instructions to be processed by the load/store unit 28, or an instruction prefetcher cache which caches information for predicting which instructions may need to be fetched into the instruction cache 8 prior to those addresses actually being requested by the fetch stage 6.

Figure 2:
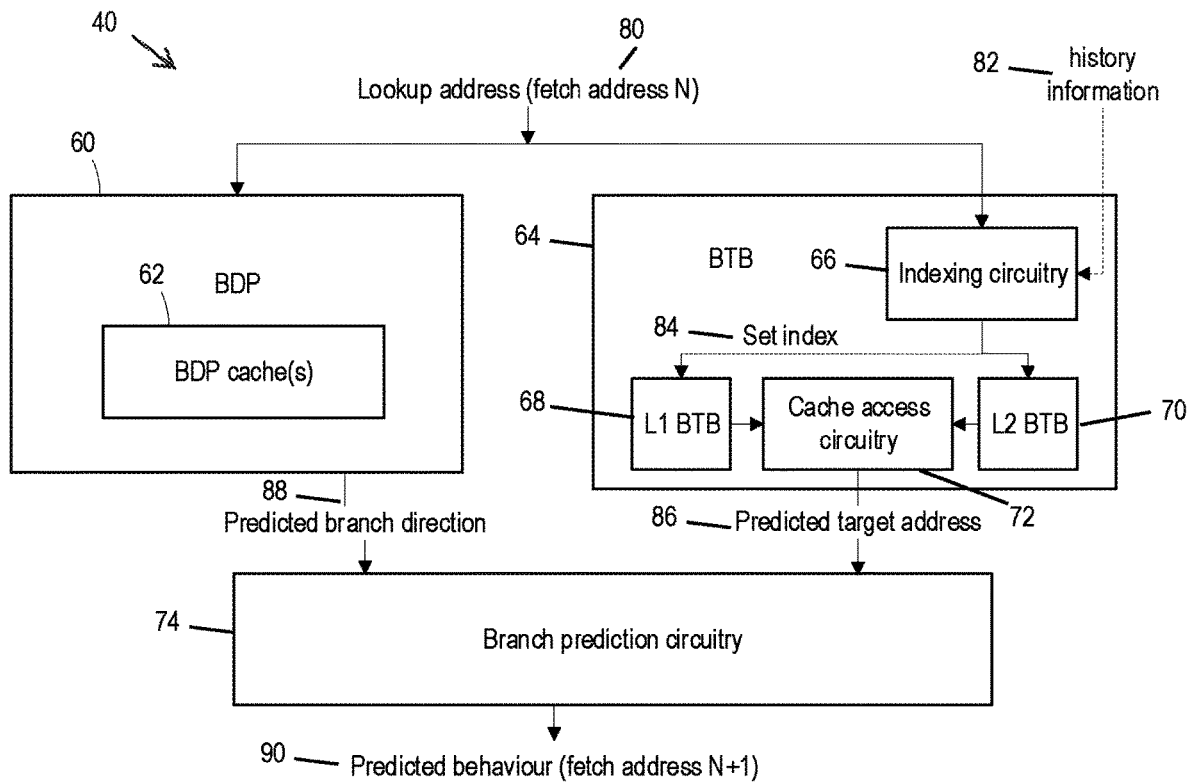
FIG. 2 shows an example of a branch predictor having a number of branch prediction caches, including a level one branch target buffer (BTB) and a level two BTB.

FIG. 2 shows in more detail components of the branch predictor 40 which comprises a branch direction predictor (BDP) 60 and branch target buffer (BTB) 64. The BDP 60 is for predicting whether the branch direction is taken or not taken for a branch within a block of instructions represented by a lookup address 80. The BDP 60 could use any branch direction prediction technique, such as bimodal prediction, TAGE, perceptron, etc. The BDP 60 has a number of branch direction prediction caches 62 for caching branch prediction state used to determine the predicted branch direction 88 for a first taken branch within the block of addresses represented by the lookup address 80.

The branch target buffer 64 provides a prediction of various branch properties associated with one or more branches within a block of instructions associated with the lookup address 80. The BTB 64 has indexing circuitry 66 for generating a set index 84 for indexing into a level 1 (L1) BTB 68 and a level 2 (L2) BTB 70. The L1 and L2 BTBs 68, 70 are examples of the first-level and second-level set-associative caches described earlier. Cache access circuitry 72 is provided for controlling access to the L1 BTB 68 and L2 BTB 70 based on the set index 84. Based on lookups of the L1 BTB 68 and L2 BTB 70, the cache access circuitry 72 determines whether there is any branch information held in the BTBs 68, 70 for the lookup address, the branch information indicating various branch properties to be predicted, including at least the predicted target address 86 of a first taken branch expected to be present within the block of instructions associated with the lookup address. Based on the predicted branch direction 88 and predicted target address 86 provided by the BDP 60 and the BTB 64 respectively, branch prediction circuitry 74 determines a predicted behaviour 90 associated with the lookup address 80, where for the branch predictor 40 the predicted behaviour 90 is a fetch address to be used in a subsequent cycle N+1 after the cycle N in which the fetch address used as the lookup address 80 is provided. That is, the predicted address output as the fetch address for cycle N+1 may become the lookup address in the following cycle. Instructions may be fetched from a sequence of fetch addresses determined based on the predictions made by the branch predictor.

Information in the BDP caches 62 and L1 and L2 BTBs 68, 70 is updated based on actual results of executed branches determined by the branch unit 24 in the execute stage 16.

Figure 3:
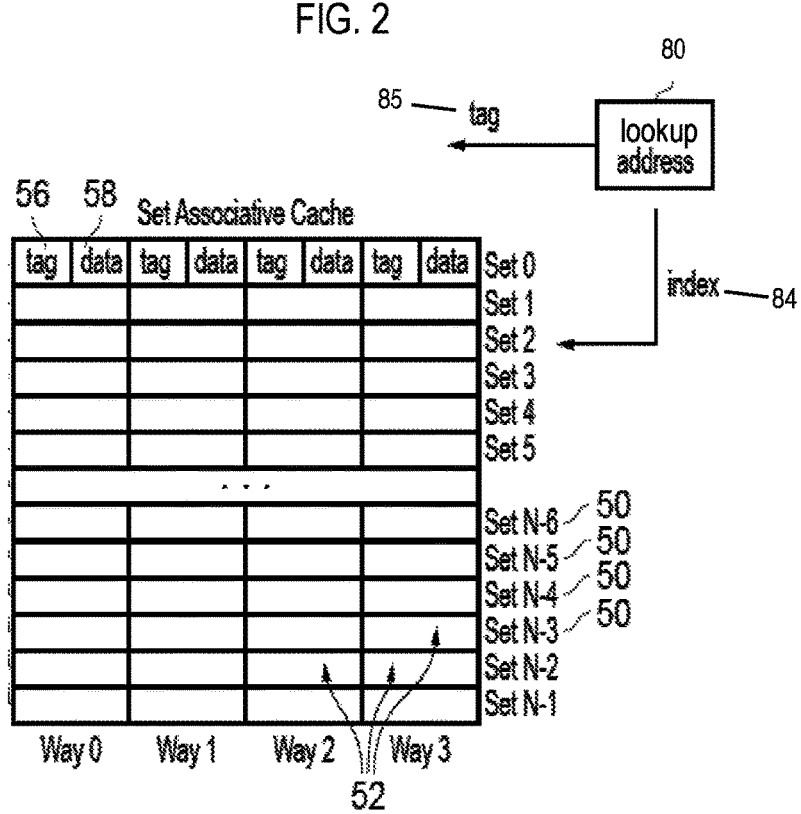
FIG. 3 illustrates an example of a set-associative cache.

The L1 BTB 68 and L2 BTB 70 may each be implemented as set-associative caches. As shown in FIG. 3, a set-associative cache has a number of entries 52 which are logically partitioned into a number of sets 50. Each set comprises a certain number of entries (or cache ways), and the number of ways per set is referred to as the associativity of the cache. For example, FIG. 3 shows an example of a 4-way set-associative cache, which means that each set 50 comprises 4 entries 52.

When looking up the cache to determine whether the cache holds valid data for a given lookup address 80, the indexing circuitry 66 for the cache maps the cache to a set index 84 which identifies which set 50 is to be looked up, and then tag portions 56 of each entry 52 in the selected set identified by the set index are read out and compared with a tag portion 85 derived from the lookup address 80 itself. If any of the entries 52 in the selected set 50 have a tag 56 which matches the tag 85 derived from the lookup address 80, then a cache hit is detected and data 58 in the hit entry having the matching tag 56 is returned as cached information corresponding to the lookup address 80. If all of the entries in the selected set 50 identified by the set index have tags 56 which do not match the tag 85 associated with a lookup address 80 then a cache miss is detected, and so this cache is not able to provide valid data associated with the lookup address.

Hence, when the BTB 64 needs to be looked up based on the lookup address 80 the indexing circuitry 66 uses a hash function to map the lookup address 80 to the set index 84. In some examples, as shown in FIG. 2 the hash function for generating the set index 84 may also depend on history information 82 which indicates properties associated with a certain number of previous branches, e.g. indicating a sequence of taken/not-taken outcomes for a certain number of most recently executed or predicted branches, or portions of bits from target addresses of a number of recent branches. The history information 82 can be used to distinguish different paths by which a given branch may be reached in a given program, which can help to provide more accurate predictions of different branch target addresses for different paths taken to reach the branch.

The L2 BTB 70 is slower to access than the L1 BTB 68. Typically the L2 BTB may be looked up when there is a miss in the L1 BTB (although some implementations may support looking up the L2 BTB even if there is a hit in the L1 BTB, for example if the L2 BTB is capable of storing information on additional branches within the same block of instructions as the block whose lookup address is being looked up in the L1 BTB 68, so that it is possible that the lookup address could hit in both structures).

In the techniques described below the set index 84 used for indexing into the L1 and L2 BTBs 68, 70 is the same, and the same hash function is used by the indexing circuitry 66 to generate the set index 84 for both L1 and L2 BTB 68, 70. This can help to support fast read/writes to the respective BTBs in cases where entries need to be migrated between the BTBs, which might otherwise not be straightforward for instances where the L1 and L2 BTB 68, 70 are implemented using single-ported RAM.

Figure 4:
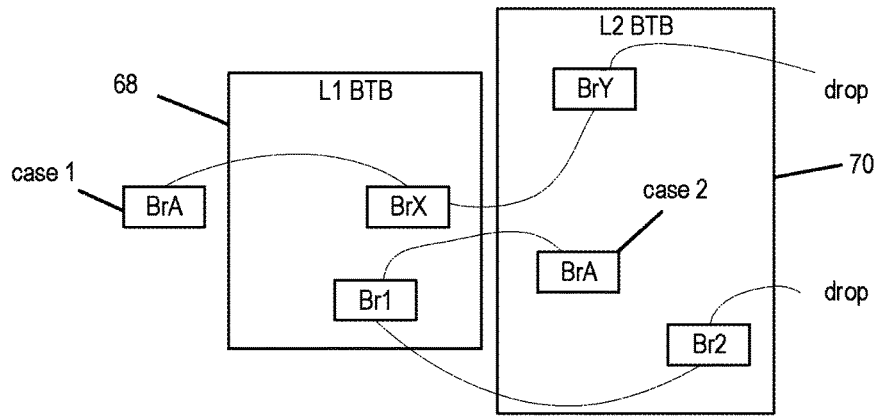
FIG. 4 shows, for comparison, an approach where the second-level set-associative cache has a different number of sets and a different indexing scheme to a first-level set-associative cache.

FIG. 4 is a diagram for explaining issues which arise in implementations which use a different number of sets in the L2 BTB 70 compared to the L1 BTB 68, and which use a different set indexing scheme. In such an implementation it is possible that a given address may map to a different set in the L2 BTB 70 compared to the L1 BTB 68. This can cause some issues when needing to promote or demote entries to migrate them between the BTBs 68, 70 in cases where a first cache lookup into the L1 BTB 68 identifies a cache miss.

As shown in FIG. 4, when the BTB 64 receives a request specifying the lookup address 80, the BTB can check both L1 L2 BTBs 68, 70 to determine whether there is a hit entry corresponding to the lookup address. If there is a hit entry in the L1 BTB 68, no update is needed.

If both L1 and L2 lookups miss for the lookup address (case 1 illustrated in FIG. 4), and it is determined that branch information for a branch BrA associated with that lookup address needs to be allocated, and there is no spare invalid entry available in the set of the L1 BTB 68 corresponding to the lookup address, a victim entry is selected in the corresponding set of the L1 BTB, and information for BrA can be allocated to that victim entry (a first access). However, the information for the branch BrX previously represented by the victim L1 BTB entry will then be migrated to a second victim entry in the L2 BTB, and the information for the branch BrY represented by the second victim entry may be discarded (the update of the second victim entry to change the information for branch BrY to the information for branch BrX is a second access), As the address of branch BrX may correspond to a different set in the to the address Alternatively, if the L1 lookup misses, but the L2 lookup hits in an entry corresponding to branch BrA (case 2 illustrated in FIG. 4), the entry for branch BrA is migrated to the L1 BTB where (if there are no spare invalid entries in the set corresponding to the lookup address) a first victim entry is selected in L1 BTB to be evicted to L2 BTB 70 and reallocated for representing BrA instead of B0 which was previously represented by the first victim entry. The victimized entry from L1 BTB then seeks space in the L2 BTB (which may need a further access to a second victim entry in the L2 BTB 70 since BrA and Br1 may be mapped to different sets in the L2 BTB). The information for the branch Br2 represented by the second victim entry is discarded. Hence, if different set indexing schemes are used, in case 2 it may be needed to update 3 different entries in the BIB hierarchy: invalidating the L2 BTB entry for BrA being promoted to the L1 BTB; updating the first victim entry for Br1 in the L1 BTB to reallocate it to branch BrA, and updating the second victim entry for Br2 in the L2 BTB to reallocate it to branch Br1.

Also, the use of different set indexing schemes for the two levels of cache 68, 70 means that when information for a given branch BrX, Br1 needs to be demoted from the L1 BTB 68 to the L2 BTB 70, the cache access circuitry 72 cannot start to determine which entry of the L2 BTB (BrY or Br2) should be updated with the information demoted from the L1 BTB 68 until after the tag information 56 associated with the victim entry in the L1 BTB has been read, because it is possible that the entry to be updated using the evicted information could be in a different set to the set accessed for the initial L2 BTB lookup.

Figure 5:
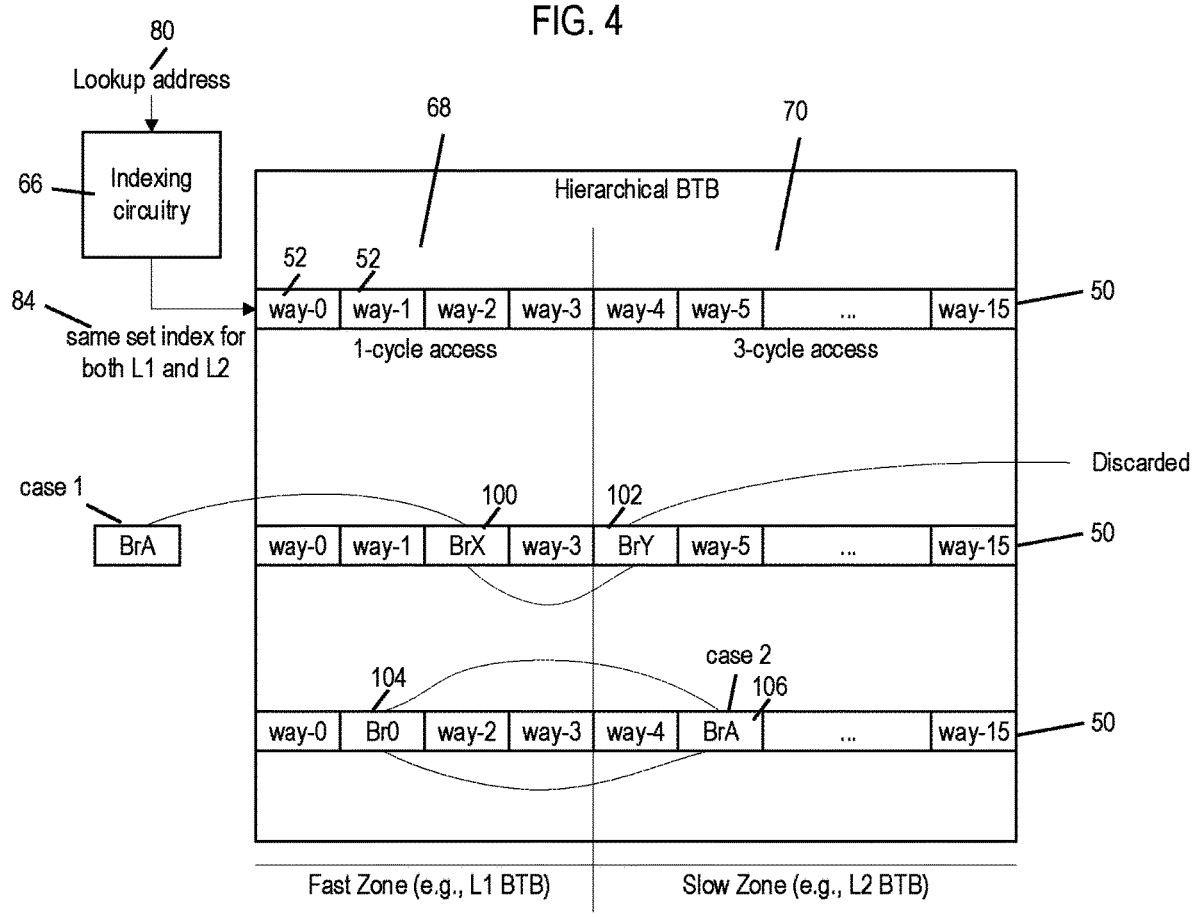
FIG. 5 shows an approach where the first and second levels of cache share a same indexing scheme and have the same number of sets.

FIG. 5 shows a different approach where the L1 BTB 68 and L2 BTB 70 are provided with the same number of sets 50 and the indexing circuitry 66 maps the lookup address 80 to the same set index 84 for both the L1 and L2 BTBs 68, 70. Therefore, the indexing circuitry 66 uses the same indexing scheme for both levels and is incapable of mapping a given lookup address 80 to different set indices in the respective L1 and L2 BTBs 68, 70. In this example, the L2 BTB 70 has a greater associativity than the L1 BTB 68, for example in this case the L1 BTB 68 comprises 4 ways while the L2 BTB comprises 12 ways. However, this is not essential and other numbers of ways may be provided in both the L1 and L2 BTB 68, 70, The L2 BTB 70 acts as an exclusive cache, which means that the L2 BTB 70 does not guarantee that all addresses having valid entries cached in the L1 BTB 68 will also have a corresponding entry in the L2 BTB 70.

Logically, as shown in FIG. 5 the two-level BTB 68, 70 as a whole may be considered to be a monolithic large set-associative cache structure with a certain number of ways per set (16 ways in total in this example), but from a physical hardware point of view the BTB is split into two parts, a fast zone representing the L1 BIB 68 and a slow zone representing the L2 BTB 70, Entries 52 in the fast zone 68 can be accessed in fewer cycles than entries in the slow zone 70. For example this may be because longer wires may be needed to reach the entries 52 in the slow zone 70 (e.g. because the slow zone entries may be further away from the cache access circuitry 72 on an integrated circuit compared to the fast zone entries 68).

With this approach, faster operations are possible for migrating entries between the levels, due to the common set indexing scheme. In case 1 explained with respect to FIG. 4, where the lookup address for a certain branch BrA misses in both the L1 and L2 BTB 68, 70, then a first victim entry 100 for branch BrX in the fast zone 68 may be victimised and pushed out to the slow zone where it replaces a second victim entry 102 within the L2 BTB 70, The contents of the second victim entry 102 may be discarded, Due to the common set indexing scheme used for both levels of cache 68, 70, operations for selecting the second victim entry 102 can begin before contents of any entries of the selected set corresponding to the lookup address 80 in the first level BTB 68 have been read, because the selected set for the second level BTB 70 will already be known at the point when the set index 84 is generated for the first-level BTB lookup, and so it is not necessary for such victim selection operations for selecting the second victim entry 102 to be made sequentially after reading information from the first victim entry 100 such as the tag portion 56 used to identify which address is being evicted. This is because in the case of FIG. 5, unlike in FIG. 4, the set used to provide the second victim entry 102 for branch BrY does not depend on any contents of the first victim entry 100 since the second victim entry 102 will always have the same set index as the first victim entry. This means that, for example, if the victim selection of the second victim entry 102 depends on replacement policy information (e.g. round robin information tracking the least recently allocated entry in the set, or least recently used (LRU) information tracking the least recently looked up entry in the set), the replacement policy information can be read before any reads of the first victim entry 100 are complete, which can reduce the latency of performing the migration of entry 100 to the L2 BTB 70. In contrast, in FIG. 4 in case 1, the set index for entry BrY to be evicted from the L2 BTB 70 cannot be determined until after the tag has been read from the victim entry for branch BrX selected in the L1 BTB 68, which could map to a different set in the L2 BTB 70 compared to the set associated with the looked up address for branch BrA.

Hence, in case 1 the approach shown in FIG. 5 can provide opportunities for performance improvement by allowing increased parallelization between the operations for looking up the first level BTB and operations for selecting the second victim entry 102 (e.g. reading of replacement policy information associated with entries in the selected set of the second level BTB 70 could start before tags of the first level BTB have been read out for the selected set in the first level BTB 68).

Similarly, in case 2 explained with respect to FIG. 4, when the approach shown in FIG. 5 is used then, rather than needing a third entry to be updated for branch Br2 as shown in FIG. 4, instead in FIG. 5 the contents of a first victim entry 104 and a second victim entry 106 in the L1 and L2 BTBs 68, 70 respectively can simply be swapped. By avoiding the need for a third entry to be updated this improves performance when swapping entries between the levels of cache. Also, this can help to improve cache hit rates because the swapping of entries 104 and 106 means there is no need to evict information for a further branch Br2 from the L2 BTB, helping to improve performance. Again, this approach allows the victim selection operations for selecting the second victim entry 106 to start before a tag value of the first victim entry 104 has been read, for example.

Portions of the victim selection operation for selecting the second victim entry 102, 106 in either case 1 or case 2 may be performed in parallel with at least one of: a portion of a first-level cache lookup to identify whether there is a cache hit or miss in the L1 BTB 68, at a portion of second-level cache lookup to determine whether there is a cache hit or miss in the second-level BTB 70, or an operation to read contents 56, 58 of a victim entry 100, 104 in the first-level BTB 68.

Figure 6:
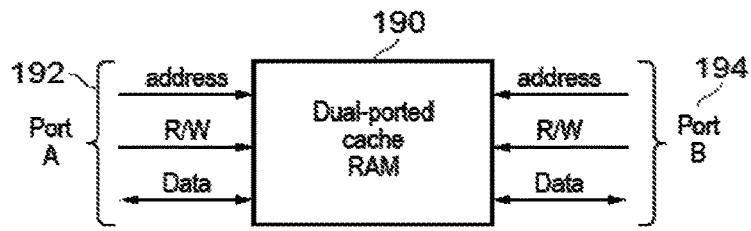
FIGS. 6 and 7 contrast dual-ported cache RAM (random access memory) and single-ported cache RAM.
Figure 7:
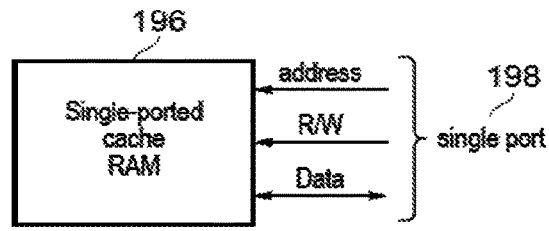

The techniques shown in FIG. 5 can be particularly useful for implementations using single-ported cache RAM. As shown in FIG. 6, a dual ported cache RAM 190 could be used to implement one of the caches 68, 70, and in this case the cache may include a first read/write port 192 and a second read/write port 194, which in each processing cycle can each provide a read or write request to the cache RAM 190, Hence, it is possible to perform both a read and a write to the cache in the same cycle (to different locations within the cache). In contrast, FIG. 7 shows a single-ported cache RAM 196 which only has a single read/write port 198 and so is only capable of either a read or a write in any given cycle. When performing migrations of entries between levels of cache then this may require some entries to be both read and written, which in a single-ported cache RAM 196 as shown in FIG. 7 would not be possible in the same cycle. Hence, any techniques which can be used to reduce the number of entries which need to be updated or to allow greater parallelism of operations between the first and second levels of cache (which could each be implemented as a separate module of single-ported cache RAM so that it is possible to perform a read/write the second level cache 70 in parallel with a read/write to the first-level cache 68) may greatly help to reduce the timing pressure, which is particularly useful for BTB structures because the branch predictor 40 is a busy component being looked up in virtually every cycle, unlike other less frequently accessed cache structures such as the L1 data cache 30.

Nevertheless, the techniques shown in FIG. 5 of providing the same number of sets in both L1 and L2 caches could also be used for other types of prediction cache, or for caches which do not provide any prediction at all (such as the L1 and L2 data caches 30, 32). While the examples above show a hierarchy with only two cache levels, it is possible to apply the technique to any two levels among a hierarchy with three or more levels. If there is a third cache level then it is not essential for that third cache level to include the same number of sets as the other two levels, or alternatively the third level may also have its number of sets aligned with the other two levels so as to provide a common indexing scheme for the third level as well. Hence, in general while there may be at least two levels which share the same set indexing scheme provided by the indexing circuitry 66, it is not essential for all levels of cache to implement this. A performance improvement may be provided even if the number of sets is the same only for a subset of at least two caches among a hierarchy including three or more levels of cache.

Figure 8:
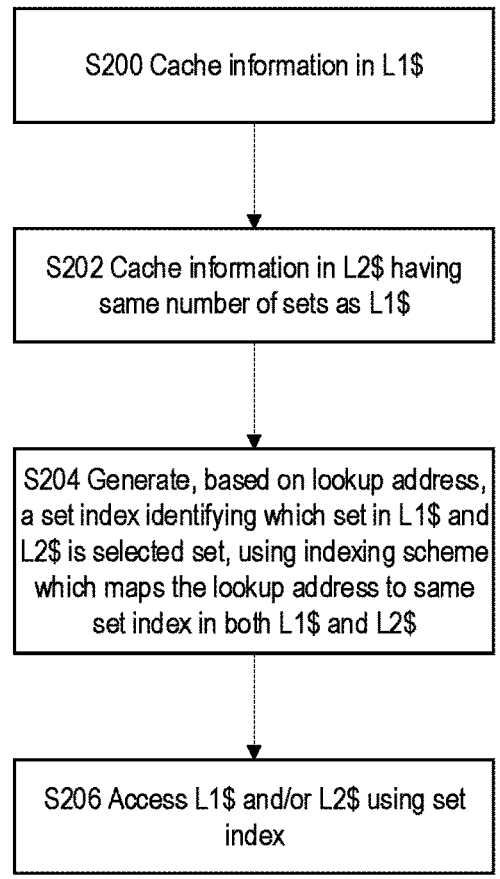
FIG. 8 is a flow diagram illustrating a method of use for a multi-level cache hierarchy.

FIG. 8 illustrates a method of controlling cache accesses. At step S200 information is cached in a L1 cache 68. At step S202 information is cached in a L2 cache 70 having the same number of sets 50 as the L1 cache 68, where both the L1 and L2 caches are set-associative caches. At step S204, indexing circuitry 66 generates, based on a lookup address 80 to be looked up in one or both of the levels of cache 68, 70, a set index 84 identifying which set 50 of entries 52 in the L1 and/or L2 caches 68, 70 is the selected set to be looked up to check whether any of the entries in the selected set contains information for the lookup address. The set indexing scheme used by the indexing circuitry 66 is the same for both first and second levels of cache 68, 70, so that the lookup addresses map to the same set index 84 for both levels. At step S206 the cache access circuitry 72 controls access to the respective levels of cache using the set index 84 generated at step S204.

Figure 9:
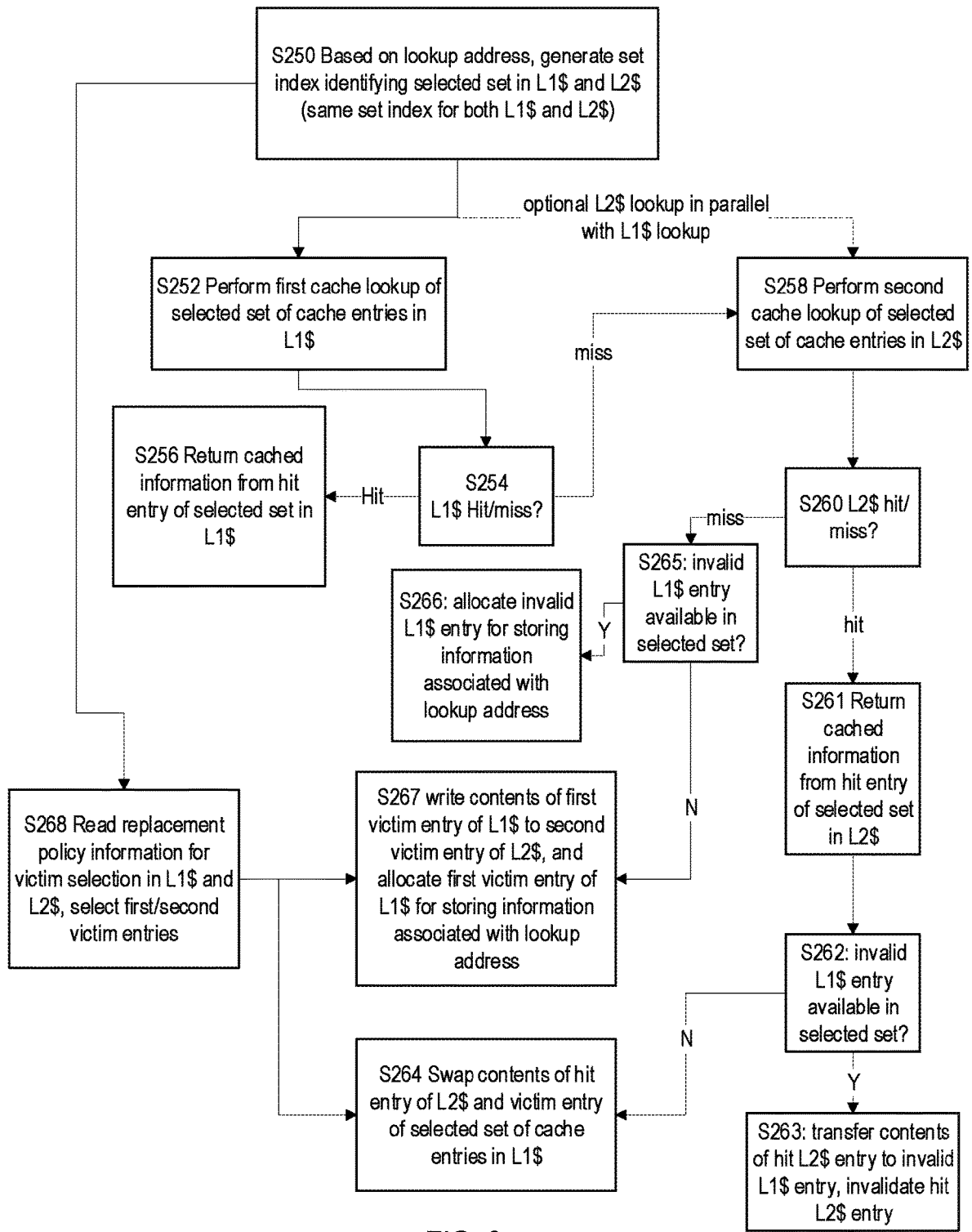
FIG. 9 shows in more detail a method for controlling lookups of the first and second levels of cache.

FIG. 9 shows a flow diagram illustrating in more detail control of lookups to the first and second level caches 68, 70. At step S250, the indexing circuitry 66 generates, based on the lookup address 80, the set index 84 identifying the selected set of entries in both the L1 and L2 caches 68, 70 (the same set index is generated for both levels). A hash function could be used to map the lookup address to the set index. The hash function could take as inputs the lookup address, and optionally at least one other parameter such as branch history information 82 as discussed above.

At step S252 a first cache lookup is performed by the cache access circuitry 72 to determine whether any of the selected set of L1 cache entries identified by the set index 84 provide valid data corresponding to the lookup address. The first cache lookup compares the tags 56 in the selected set 50 of entries identified by the set index 84 with a tag portion 85 derived from the lookup address 80. At step S254 the cache access circuitry 72 determines whether the L1 cache lookup identified a hit or a miss (a hit occurs when one of the selected set of entries has a tag 56 corresponding to the tag portion 85 for the lookup address, and a miss occurs when none of the selected set of entries has a tag 56 corresponding to the tag portion 85), If a hit is detected, then at step S256 cached information is returned from the hit entry of the selected set of entries in the L1 cache; where the hit entry is the entry for which the tag 56 match the tag as derived from the lookup address 80. If a hit is detected, it is not essential to look up the L2 cache 70, although in implementations where it is possible that the L2 cache could cache further information associated with the lookup address (e.g. additional branch information relating to other branches in the same instruction block), then the method could continue to step S258 for performing a second cache lookup.

If at step S254 a miss was detected in the L1 cache then at step S258 a second cache lookup is performed, using the set index derived at step S250, to determine whether any of the selected set of cache entries in the L2 cache 70 corresponds to the lookup address. As shown in the dotted line in FIG. 9, optionally the second cache lookup at step S258 could be initiated in parallel with the first cache lookup at step S252, regardless of whether the first cache lookup generates a hit or a miss. However, in some cases the second cache lookup may be activated subsequent to the first cache lookup once it has been determined whether a hit has been detected in the first cache lookup, to avoid incurring the power cost associated with performing the second cache lookup if the second cache lookup is not necessary.

At step 3260, the cache access circuitry compares the tags 86 in the selected set 50 of L2 cache entries corresponding to the set index 84 with the tag portion 85, and determines whether there is a hit entry corresponding to the lookup address 80. If a hit is detected in the L2 cache 70 then at step S261 the cache access circuitry 72 returns the cached information from the hit entry of the L2 cache for use by the prediction circuitry 74 or other circuit element which is requesting this information. At step S262 the cache access circuitry 72 determines whether there is an invalid L1 cache entry available in the selected set of the L1 cache 68 corresponding to the set index 84, and if so then at step S263 the information from the hit entry of the L2 cache 70 can be allocated to that invalid entry of the L1 cache 68 and the hit entry can be invalidated in the L2 cache 70. However, if there is no invalid entry available in the selected set of the L1 cache, then at step S264 the cache access circuitry 72 controls the L1 and L2 caches 68, 70 to swap the contents of the hit entry 106 in the L2 cache with a victim entry 104 of the L1 cache. The selection of the victim entry in the first-level cache 68 may depend on replacement policy information associated with the set of entries 50 in the first-level cache 68 which corresponds to the set index 84. As shown at step S268, operations to read the replacement policy information for victim selection in the L1 cache 68 can be initiated once the set index has been derived from the lookup address at step S250 and they take place in parallel with other operations performed in the first cache lookup or second cache lookup. The reading of the replacement policy information for victim selection in the first level cache does not depend on the contents of the hit entry in the L2 cache identified at step S260, and so can be performed in parallel and this may accelerate the selection of the victim entry to which the contents of the hit entry of the L2 cache are to be written in the L1 cache 68. Also, there is no need to evict a further L2 BTB entry (similar to the entry for Br2 in FIG. 4), as branches Br0 and BrA in the first victim entry 104 and hit entry 106 always correspond to the same set index in both levels of cache 68, 70.

On the other hand if at step S260 the L2 cache lookup performed at step S258 identifies a cache miss, at step S265 the cache access circuitry 72 determines whether there is an invalid entry available in the L1 cache 68 in the selected set corresponding to the set index 84. If so, at step S266 information associated with the lookup address is allocated to that invalid entry. This newly allocated information may not be allocated right away e.g. for a data cache hierarchy this information may need to wait for a cache linefill from memory, or for a BTB cache hierarchy as shown in FIG. 2 the allocation may need to wait for actual branch information to be determined at the branch unit 24 in the execute stage of the pipeline. If there is no invalid entry available in the selected set of the L1 cache 68, then eviction of some information from a first victim entry 100 of the L1 cache is performed. In that case, at step S267 contents of a first victim entry 100 in the L1 cache 68 are written to a second victim entry 102 in the L2 cache 70 and the first victim entry 100 is allocated for storing the new information associated with the lookup address 80 which was not previously cached in either the L1 or L2 caches 68, 70. Information from the second victim entry 102 in the L2 cache 70 is discarded. Again, selection of both the first and second victim entries 100, 102 may depend on replacement policy information which can be read at step S268 in parallel with other aspects of the first and second cache lookups. In particular, the replacement policy information for selecting the second victim entry 102 can be read at step S268 without waiting for a tag of the first victim entry 100 to be read, because the selection of the second victim entry is independent of contents of the first victim entry 100. This is due to the use of the same set indexing schemes in both L1 and L2 caches 68, 70. This can provide more opportunities for pipelining of operations to improve performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   a first-level set-associative cache comprising a plurality of sets of cache entries;
   a second-level set-associative cache comprising a plurality of sets of cache entries, where a number of sets in the first-level set-associative cache is the same as a number of sets in the second-level set-associative cache; and
   indexing circuitry to generate, based on a lookup address, a set index identifying a selected set of cache entries in the first-level set-associative cache and/or a selected set of cache entries in the second-level set-associative cache to be looked up for information associated with the lookup address,
   wherein:
   the indexing circuitry is configured to generate the set index using an indexing scheme which maps the lookup address to the same set index for both the first-level set-associative cache and the second-level set-associative cache; and
   the apparatus comprises prediction circuitry to determine a predicted behaviour associated with the lookup address based on information cached in a cache entry of the first-level set-associative cache or the second-level set-associative cache associated with the lookup address.

2. The apparatus according to claim 1, comprising cache access circuitry to perform:
   a first cache lookup to determine whether any of the selected set of cache entries in the first-level set-associative cache caches the information associated with the lookup address; and
   a second cache lookup to determine whether any of the selected set of cache entries in the second-level set-associative cache caches the information associated with the lookup address.

3. The apparatus according to claim 2, in which when the second cache lookup identifies a cache hit where a hit entry of the selected set of cache entries in the second-level set-associative cache caches the information associated with the lookup address, and there is no invalid entry in the selected set of cache entries in the first-level set-associative cache which can accommodate the information from the hit entry, the cache access circuitry is configured to swap contents of the hit entry of the second-level set-associative cache and a victim entry of the selected set of cache entries in the first-level set-associative cache.

4. The apparatus according to claim 3, in which when the second cache lookup identifies the cache hit and there is no invalid entry in the selected set of cache entries in the first-level set-associative cache which can accommodate the information from the hit entry, the cache entry of the second-level set-associative cache that is updated with contents of the victim entry of the first-level set-associative cache is the hit entry regardless of which address is associated with information cached in the victim entry of the first-level set-associative cache.

5. The apparatus according to claim 3, in which, when swapping the contents of the hit entry of the second-level set-associative cache and the victim entry of the first-level set-associative cache, the cache access circuitry is configured to perform an atomic update operation on the hit entry and the victim entry.

6. The apparatus according to claim 2, in which when both the first cache lookup and the second cache lookup identify a cache miss where none of the selected set of cache entries in the first-level set-associative cache and the second-level set-associative cache caches the information associated with the lookup address, the cache access circuitry is configured to write contents of a first victim entry of the selected set of cache entries in the first-level set-associative cache to a second victim entry of the selected set of cache entries of the second-level set-associative cache and allocate the first victim entry for storing information associated with the lookup address.

7. The apparatus according to claim 6, in which the cache access circuitry is configured to select the second victim entry independent of the contents of the first victim entry.

8. The apparatus according to claim 6, in which the cache access circuitry is configured to select the second victim entry based on replacement policy information associated with the selected set of cache entries of the second-level set-associative cache, and is configured to read the replacement policy information before a read of the first victim entry is complete.

9. The apparatus according to claim 6, in which the cache access circuitry is configured to select the second victim entry based on replacement policy information associated with the selected set of cache entries of the second-level set-associative cache, and is configured to read the replacement policy information in parallel with at least one of:
the first cache lookup;
the second cache lookup; and
reading of the first victim entry to obtain the contents to be written to the second victim entry.

10. The apparatus according to claim 6, in which the cache access circuitry is configured to perform an atomic update operation on the first victim entry and the second victim entry to allocate the first victim entry for storing the information associated with the lookup address and to write the contents of the first victim entry to the second victim entry.

11. The apparatus according to claim 1, in which, in response to a cache access request to request information associated with the lookup address, when the information associated with the lookup address is obtained from the first-level set-associative cache, the information is accessible in fewer cycles than when the information associated with the lookup address is obtained from the second-level set-associative cache.

12. The apparatus according to claim 1, in which the second-level set-associative cache is an exclusive cache.

13. The apparatus according to claim 1, in which the second-level set-associative cache has a greater number of ways per set than the first-level set-associative cache.

14. The apparatus according to claim 1, in which the first-level set-associative cache and the second-level set-associative cache each comprise single-ported random access memory.

15. An apparatus comprising:
a first-level set-associative cache comprising a plurality of sets of cache entries;
a second-level set-associative cache comprising a plurality of sets of cache entries, where a number of sets in the first-level set-associative cache is the same as a number of sets in the second-level set-associative cache; and
indexing circuitry to generate, based on a lookup address, a set index identifying a selected set of cache entries in the first-level set-associative cache and/or a selected set of cache entries in the second-level set-associative cache to be looked up for information associated with the lookup address,
wherein:
the indexing circuitry is configured to generate the set index using an indexing scheme which maps the lookup address to the same set index for both the first-level set-associative cache and the second-level set-associative cache; and
the apparatus comprises branch prediction circuitry to determine at least one of:
a predicted branch instruction behaviour associated with the lookup address based on branch prediction information cached in a cache entry of the first-level set-associative cache or the second-level set-associative cache associated with the lookup address; and
a predicted target address for a first taken branch instruction predicted to occur within a block of one or more instructions associated with the lookup address, based on branch target buffer information cached in a cache entry of the first-level set-associative cache or the second-level set-associative cache associated with the lookup address.

16. A method comprising:
caching information in a first-level set-associative cache comprising a plurality of sets of cache entries;
caching information in a second-level set-associative cache comprising a plurality of sets of cache entries, where a number of sets in the first-level set-associative cache is the same as a number of sets in the second-level set-associative cache;
generating, based on a lookup address, a set index identifying a selected set of cache entries in the first-level set-associative cache and/or a selected set of cache entries in the second-level set-associative cache to be looked up for information associated with the lookup address, where the set index is generated using an indexing scheme which maps the lookup address to the same set index for both the first-level set-associative cache and the second-level set-associative cache; and
determining a predicted behaviour associated with the lookup address based on information cached in a cache entry of the first-level set-associative cache or the second-level set-associative cache associated with the lookup address.

* * * * *